(12) United States Patent
Tsai et al.

(10) Patent No.: US 9,042,820 B2
(45) Date of Patent: May 26, 2015

(54) MITIGATING SIGNAL OFFSETS IN OPTICAL RECEIVERS

(75) Inventors: Huan-Shang Tsai, Cupertino, CA (US); Jeffrey T. Rahn, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 982 days.

(21) Appl. No.: 12/790,780

(22) Filed: May 28, 2010

(65) Prior Publication Data
US 2011/0293292 A1    Dec. 1, 2011

(51) Int. Cl.
*H04B 7/00* (2006.01)
*H04B 10/69* (2013.01)

(52) U.S. Cl.
CPC ................................. *H04B 10/697* (2013.01)

(58) Field of Classification Search
USPC .............. 455/41.2, 127.2, 130; 398/202, 209, 398/212
See application file for complete search history.

(56) References Cited

U.S. PATENT DOCUMENTS

| | | | |
|---|---|---|---|
| 7,505,744 B1* | 3/2009 | Shan | 455/130 |
| 2003/0109241 A1* | 6/2003 | Kim | 455/324 |
| 2005/0197064 A1* | 9/2005 | Ibrahim et al. | 455/41.2 |
| 2005/0250459 A1* | 11/2005 | Tervaluoto et al. | 455/127.2 |

* cited by examiner

*Primary Examiner* — Junpeng Chen
(74) *Attorney, Agent, or Firm* — Ross M. Carothers; David L. Soltz

(57) ABSTRACT

An optical receiver circuit is disclosed in which a number of electrical signals are processed to extract data encoded therein. The electrical signals may be compared during the process to selectively remove one or more waveforms from one or more corresponding electrical signals. Various data signals, each including one or more waveforms, may then be processed to extract the encoded data. The optical receiver circuit reduces, or eliminates, electrical offsets which may be present in one or more of the electrical signals to reduce corresponding errors in the encoded data signals.

11 Claims, 9 Drawing Sheets

MITIGATING SIGNAL OFFSETS IN OPTICAL RECEIVERS

BACKGROUND OF THE INVENTION

1. Field of the Invention

This invention relates generally to optical telecommunication systems and, more particularly, to receivers employed in such systems.

2. Description of the Related Art

Wavelength-division multiplexed (WDM) optical communication systems are known in which multiple optical signals, each having a different wavelength, are combined onto a single optical fiber. With the demand for increased capacity for the WDM optical communication systems, a correspondingly similar increase in complexity occurs. For example, in order to further increase the data rates associated with WDM systems, various modulation formats have been proposed for generating the modulated laser output. One such optical signal modulation format for example, known as polarization multiplexed differential quadrature phase-shift keying ("Pol Mux DQPSK"), can provide spectral densities with higher data rates per unit of fiber bandwidth than other modulation formats, such as on-off keying (OOK). Receivers designed to receive and demodulate such optical signals, at some point during the demodulation process, must be able to analyze a plurality of signals in the electrical domain in order to retrieve the encoded data. The plurality of electrical signals are compared with one or more other ones of the plurality of electrical signals to determine relationships which may be used to define the encoded data. For example, comparison of the electrical signals may result in a pattern which can be further processed to obtain the data encoded therein. Such processing often may require that the electrical signals being compared have the same DC component, also referred herein as DC offset. When, for example, a first electrical signal having a first DC offset is compared with a second electrical signal having a second DC offset different from the first DC offset, such differences can lead to processing errors, which in turn can lead to data errors.

Thus, there is a need to provide a receiver which is able to reduce, or eliminate, DC offsets from various electrical signals in the electrical domain such that comparison of the various electrical signals can be made without regard to such DC offsets. Further, what is needed is a receiver which compensates for undesirable DC offsets introduced through mixed-signal integrated circuits in order to realize a WDM communication receiver having the ability to decode optical signals of higher bit rates, increasing the capacity of the receiver resulting in a receiver having reduced costs and increased efficiency.

SUMMARY OF THE INVENTION

Consistent with the present disclosure, a receiver is provided which reduces signal offsets among electrical signals to provide increased capacity for optical communication systems. In one aspect, the receiver is provided with a signal processing circuit which is configured to accept two or more electrical signals. The signal processing circuit is further configured to provide an error signal indicative relative the two or more electrical signals, the error signal including a first offset signal of first magnitude. A source is provided which provides a second offset signal which is combined with the error signal to form a correction signal. The second offset signal is selected to provide the first offset signal of the error signal with a second magnitude, where the second magnitude is less than the first magnitude. In this way, the signal offsets observed in the error correction signal can be reduced. In other aspects, the signal component is a DC signal component, the signal processor circuit removing the signal offsets attributable to the DC signal component, as part of the error signal for example. For purposes herein DC offsets may include offsets which have frequency components of 1 kHz or less. The source may be a programmable source and include a digital-to-analog converter which generates the second offset signal. In certain embodiments, the second offset signal may be a voltage while in other embodiments the offset signal may be a current.

In accordance with still other aspects of the present invention, the error signal is generated by an error signal circuit which accepts the correction signal as an input. The correction signal, for example, may be summed with other input signals to generate the error signal, or may be used to drive the circuit elements themselves such that outputs of the circuit elements are proportional to the error signal. In some embodiments, the error signal circuit includes amplifiers which compare incoming signals to generate the error signal, for example the error signal being the difference of two such amplifiers.

Consistent with a further aspect of this disclosure, a method may include generating an error signal indicative of the presence of a second waveform in an incoming data signal, the error signal including a DC component having a first magnitude. The method may further include generating an offset signal which is combined with the error signal to form a correction signal, the correction signal then applied to the data signal resulting in a second magnitude of the DC component of the error signal, the second magnitude of the DC component being less than the first magnitude of the DC component. In first embodiments, the offset signal is a voltage, while in second embodiments, the offset signal is a current. In still other embodiments, generating the offset signal includes providing a signal to a digital-to-analog converter.

Consistent with yet another aspect of this disclosure, another method for reducing the DC offset in a signal processing circuit consistent with the present disclosure may include providing an input signal including first and second waveforms. Generating an error signal including a DC component having a magnitude. Providing a first gain, G, and correlating the error signal with the input signal to provide a first output during a first time period, and providing a second gain, −G, to the error signal and correlating the error signal with the input signal to provide a second output during a second time period. The difference between the first and second output is then calculated to determined the magnitude of the DC component of the error signal. A correction signal is then combined with the error signal such that the magnitude of the DC component of the error signal is reduced, or eliminated.

It is to be understood that both the foregoing general description and the following detailed description are exemplary and explanatory only and are not restrictive of the invention, as claimed. Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. In the drawings wherein like reference symbols refer to like parts.

DETAILED DESCRIPTION OF THE INVENTION

An optical receiver circuit is disclosed in which a number of electrical signals are processed to extract data encoded therein. The electrical signals may be compared during the process to selectively remove one or more waveforms from one or more corresponding electrical signals. Various data signals, each including one or more waveforms, may then be processed to extract the encoded data. The optical receiver circuit reduces, or eliminates, electrical offsets which may be present in one or more of the electrical signals to reduce errors in the processing of the encoded data signals. The optical receiver, along with other circuit components and processes, may be used to demultiplex various phase shift keying optical signals, such as quadrature phase-shift keying (QPSK), polarization quadrature phase-shift keying, or polarization multiplexed phase-shift keying signals for example.

The following description is set forth for purpose of explanation in order to provide an understanding of the invention. However, it is apparent that one skilled in the art will recognize that embodiments of the present invention, some of which are described below, may be incorporated into a number of different systems and devices.

The embodiments of the present invention may include certain aspects each of which may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference will now be made in detail to the present exemplary embodiments, which are illustrated in the accompanying drawings.

Figure 1:
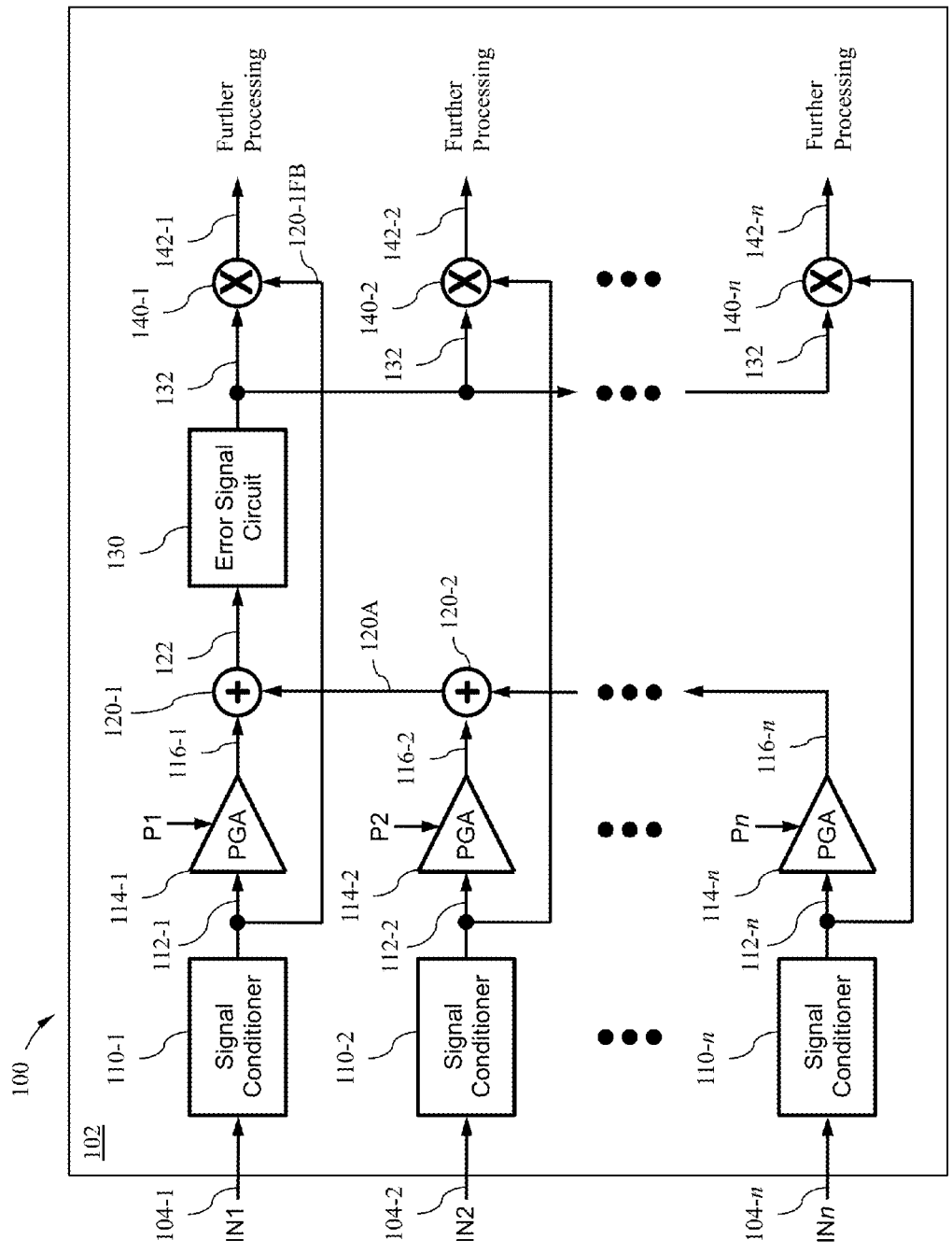
FIG. 1 is a block diagram of a first portion of a receiver consistent with various aspects of the present disclosure.

FIG. 1 illustrates a block diagram of a first portion of a receiver 10 consistent with the present disclosure, the first portion including a processing circuit 100, preferably provided on a single substrate 102. Once an optical signal, such a wavelength division multiplexed (WDM) optical signal, is received by the optical receiver 10, the optical signal is initially processed into a number of electrical signals, for example corresponding to an associated modulation format utilized to encode the data. An exemplary receiver system which may receive one or more WDM optical signals and process the optical signal into a number of electrical signals may be found in U.S. patent application Ser. No. 12/052,541, which is incorporated herein by reference in its entirety. The individual electrical signals may then be received and further processed by processing circuit 100.

Processing circuit 100 includes n number of inputs labeled IN1 through INn, each configured to receive a corresponding one of n electrical signals 104. While the following discussion is directed to the processing of n electrical signals, it is noted that the discussion equally applies to the processing of a subset of the n electrical signals. Thus, while the processing circuit 100 may have the capacity to process n channels, a fraction of the n channels may be processed in accordance with a modulation scheme which only provides for such fraction of the n channels to be processed. The electrical signals 104 are received at the corresponding inputs IN1 through INn. Each of the electrical signals 104 are provided to a corresponding signal conditioner 110 and a programmable gain amplifier 114. For example, with respect to the electrical signal 104-1 received at the input IN1, the signal 104-1 is provided to the signal conditioner 110-1 which may condition the signal 104-1 to provide a conditioned signal 112-1 at an output of the signal conditioner 110-1. The conditioned signal 112-1 may then be provided to a first input of the programmable gain amplifier (PGA) 114-1. PGA 114-1 may provide a gain, labeled as P1, to the conditioned signal 112-1 to produce an amplified signal 116-1 at an output of the PGA 114-1. The amplified signal 116-1 may then be provided to a first input of a summing element 120-1. Each of the electrical signals 104-2 through 104-n received at inputs IN2 through INn, respectively, may be processed in a similar manner, the corresponding outputs 116 of each of the PGAs 114 being provided to corresponding summing circuits 120 such that signal 120A provided to a second input of summing element 120-1 includes a summation of each of the outputs of the corresponding PGAs 114-2 through 114-n. Thus, summing element 120-1 is employed to sum all the outputs of the PGAs 114 and provide the sum as an output 122 of the summing element 120-1. It should be noted through application of desired gain settings Gain 1 through Gain n of the programmable gain amplifiers 114, any combination of the electrical signals 104 received at the corresponding inputs IN1 through INn may be compared. For example, with the applied gains P3 (not shown) through Pn set to zero, the output 122 of the summing element 120-1 would include only the output of the programmable gain amplifier 114-1 summed with the output of the programmable gain amplifier 114-2, in addition to any DC offsets associated with the specific elements of circuit 100, as discussed in greater detail below.

Figure 2:
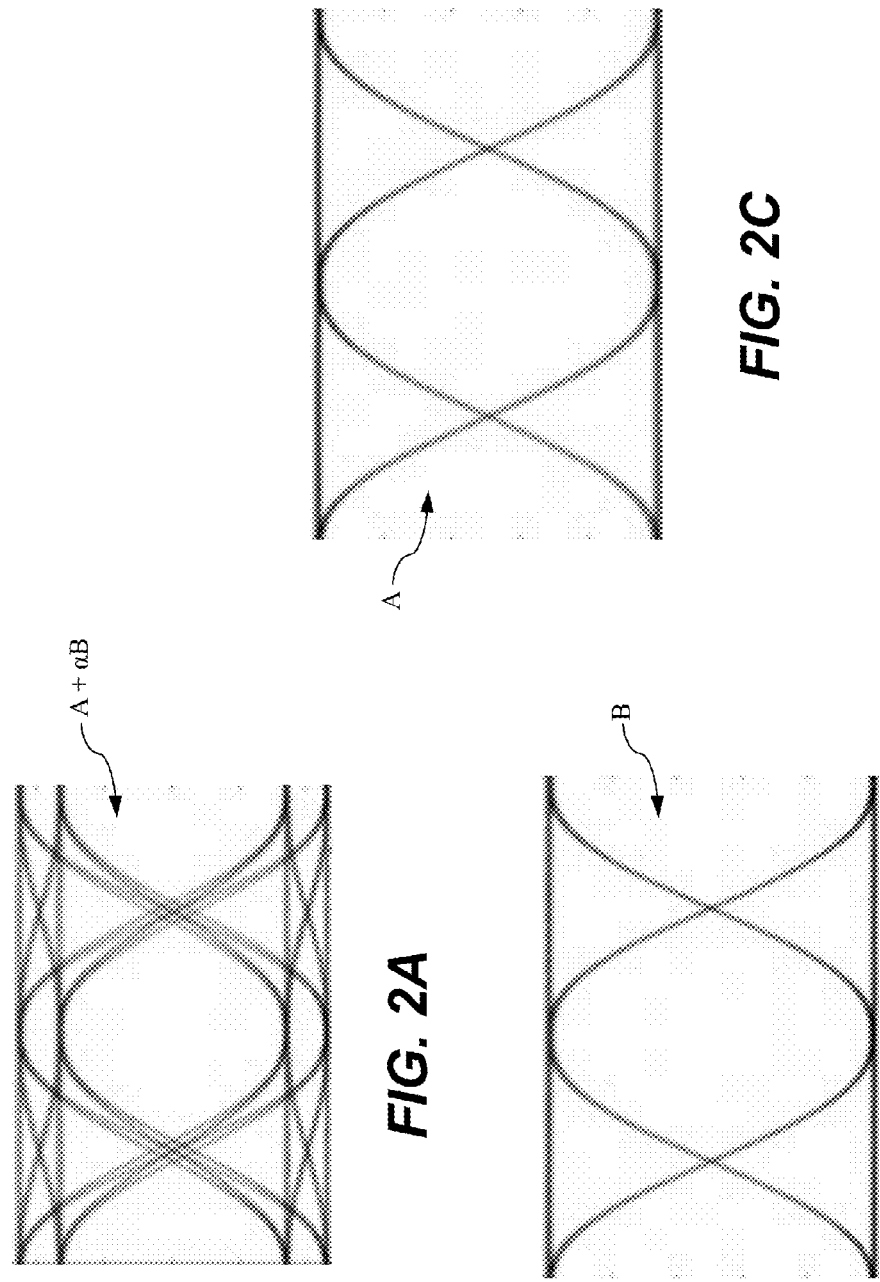
FIG. 2A is an exemplary graph depicting a signal including multiple waveforms.
FIG. 2B is an exemplary graph depicting a signal including a first of the multiple waveforms of the signal FIG. 2A, after signal processing, consistent with various aspects of the present disclosure.
FIG. 2C is an exemplary graph depicting a signal including a second of the multiple waveforms of the signal of FIG. 2A, consistent with various aspects of the present disclosure.

The output 122 of the summing element 120-1 is provided to an error signal circuit 130 which generates an error signal 132 provided at an output of the error signal circuit 130. As is discussed relative to FIG. 4 below, the error signal circuit 130 may compare one or more of the electrical signals 140, as part of signal 122 provided to the circuit 130, and derive an error signal based upon this comparison. For example, referring also to FIG. 2A, with all the gain inputs for PGAs 114-3 through 114-n set to zero the output signal 122 of summing element 120-1 corresponds to the summation of PGA 114-1 output signal 116-1 and PGA 114-2 output signal 116-2. With input signal 140-1 including first and second waveforms as depicted in FIG. 2A, and input signal 140-2 including only the second waveform as depicted in FIG. 2B, the error signal circuit 130 may provide an output signal 132 which is indicative of the present of the second waveform as part of the input signal 140-1. In this way, the error signal circuit 130 may be utilized to remove the presence of the second waveform from the input signal 104-1, resulting in the summing element output signal 122 including only the first waveform, as depicted in FIG. 2C. For example, if the PGA 114-1 output signal 116-1 includes A+αB, where A is the first waveform, B is the second waveform, and α is a number, and the PGA 114-2 output signal 116-2 includes B, then the PGA 114-2 can be provided with a gain of −α, in accordance with the output of the error signal generator 130, such that the summing element output signal 122 is A.

Turning back to FIG. 1, the error signal 132 may then be provided to a first input of n correlators, e.g. correlator 140-1 through 140-n. Each of the n correlators being configured to receive a corresponding one of the conditioned signals 120 on a second input, and provide a correlated output 142. For example, as depicted, correlator 140-1 accepts the error signal 132 on the first input and the conditioned signal on the second input, the correlator 140-1 providing the correlated output 142-1. The correlated output 142-1, for example, may be equal to the error signal 132 multiplied by the conditioned signal 112-1. In certain embodiments, the correlated signals 142 are provided as the gain inputs to the corresponding PGA 114. For example, the correlated output 142-1 may be directly or indirectly provided to the PGA 114-1 as part of the P1 input to the PGA 114-1.

Preferably, each of the elements of circuit 100 are semiconductor devices provided on the single substrate 102. Due to fabrication processes some elements, for example the signal conditioners 110, the PGAs 114 or the summing elements 120, 140, may be constructed slightly different than other similar devices. For example, PGA 114-1 may provide a DC offset as part of its amplified output signal 116-1. Thus, when the amplified signal 116-1 is summed with the amplified signal 102A in summing element 120-1, the DC offset may provide a corresponding error in the summed output 122, thus leading to additional errors in the signal processing of circuit 100 and, ultimately, data errors. One exemplary solution for reducing, or eliminating, DC offsets is presented in FIG. 3.

Figure 3:
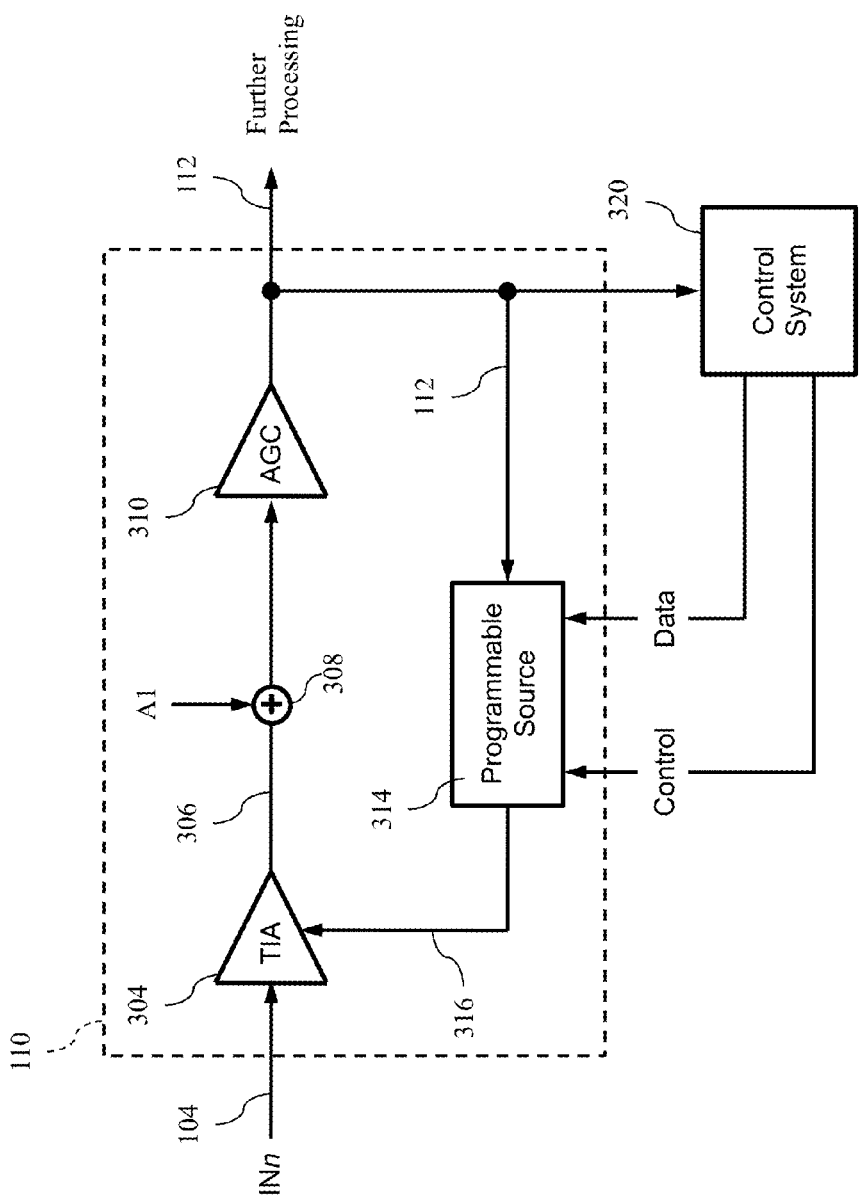
FIG. 3 is a more detailed block diagram of a first element of the receiver of FIG. 1, consistent with various aspects of the present disclosure.

FIG. 3 is a block diagram of an exemplary signal conditioner 110, as part of the processing circuit 100 of FIG. 1. The signal conditioner 110 of FIG. 2 includes a first amplifier or transimpedance amplifier 304 and a second amplifier or automatic gain control (AGC) 310. The signal conditioner 110 may include more or less elements, such as amplifiers 304, 310 or other elements including filtering elements, depending on the form of the input signal 104. For example, many optical-to-electrical conversion systems rely on photodiodes to convert the optical energy into electrical energy, as is well known in the art. Transimpedance amplifiers, such as transimpedance amplifier 304, is often desirable if the input signal 104 is in the form of an output current from a photodiode, providing faster response times and considerably larger gain, which helps to improve the signal-to-noise ratio, as is well known in the art. It is noted that other amplifiers may be utilized to receive the input signal 104 if the signal 104 is provided as a voltage, for example.

The transimpedance amplifier 304 provides an amplified output 306 to the input of the AGC 310. The signal 306 may be provided to the AGC 310 via a summing element 308 which may be used to sum additional signals A1 to the signal 306 for testing purposes, or for further correction signals consistent with this disclosure. The optional AGC 310 may be used, for example, to ensure that the amplified signal 306 is amplified across a desired voltage range. In this way, each of the input signals 104 may be amplified to have magnitudes equal to magnitudes of the remaining input signals 104. AGC 310 provides an amplified output 112 which is provided to the corresponding PGA 114, as discussed with respect to FIG. 1. A portion of the amplified signal is also provided, as part of a feedback loop, to a source or programmable source 314 and a control system 320. Control system 320 monitors the voltage of the amplified signal 112 and determines the amount of DC offset present. In response to the determined DC offset, as part of the amplified signal 112, the control system 320 may provide control and data signals to the programmable source 314 such that the programmable source provides an output signal 316 as a feedback signal to one or more elements of the signal conditioner 110 to reduce, or eliminate, an undesirable DC offset present in the amplified output signal 112. The output signal 316 from the programmable source 214, for example, may be provided to the amplifier 304 as an operating voltage source, the signal 316 providing the necessary operating voltage source to the amplifier 204 to eliminate the DC offset at the output of the signal conditioner.

Figure 4:
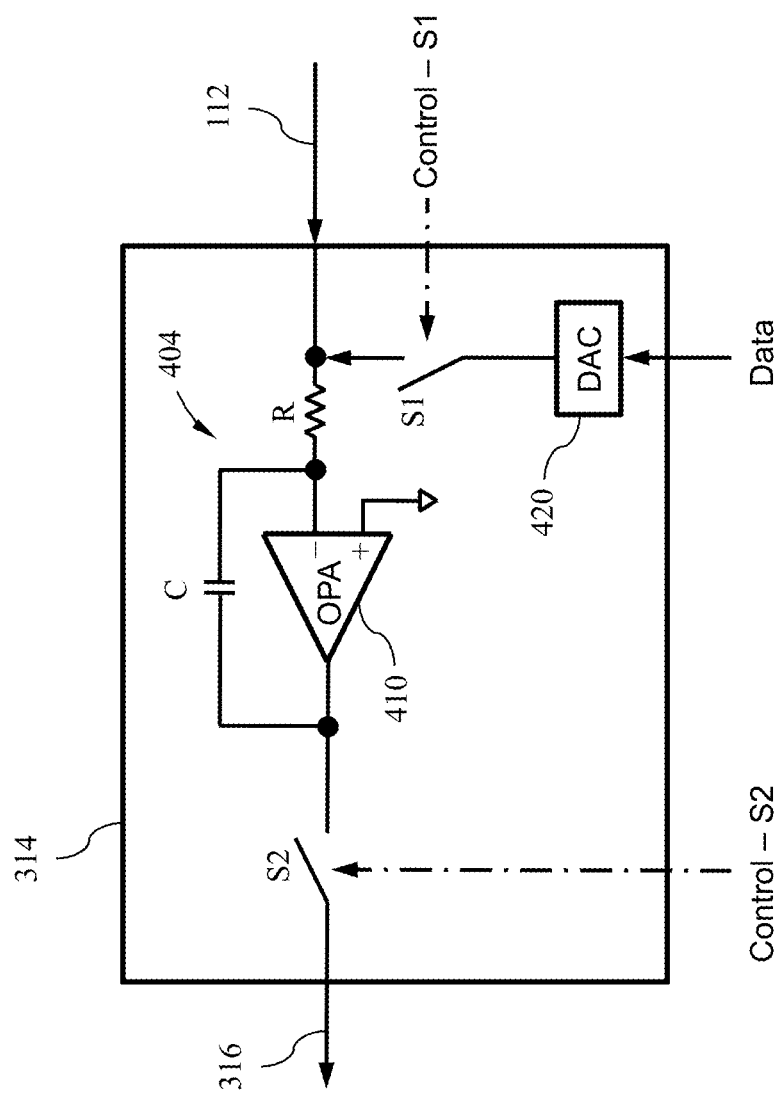
FIG. 4 is a more detailed block diagram of the first element of the receiver of FIG. 3, consistent with various aspects of the present disclosure.

Now turning to FIG. 4, one exemplary embodiment of programmable source 314 will be discussed in greater detail. As discussed with respect to FIG. 3, the amplified output signal 112 of the signal conditioner 110 is provided as an input to the programmable source 314. The exemplary programmable source 314 of FIG. 4 includes an inverting integrator circuit 404, a digital-to-analog (DAC) circuit 420 and first and second switches S1, S2. Inverting integrator circuit 404 may include an operational amplifier 410, a resistor R and a capacitor C. For example, the input signal 112 may be provided via resistor R to the inverting input of the operational amplifier 410, the capacitor C provided across the inverting input to the output of the operational amplifier 410. The non-inverting input of operational amplifier 410 may be grounded. As is well known in the art, the inverting integrator circuit 404 acts to integrate the inverting signal input and provide this at the output of the operational amplifier 410, and ultimately provided as the output signal 316 of the programmable source 314 of FIG. 3. Configured as shown, the inverting integrator circuit 404 effectively acts as a low pass filter, the output of the circuit 404 being inverted with respect to the input, e.g. the inverting input of the amplifier 410. Thus, by controlling the input to the circuit 404 a desired output can be achieved, reducing or eliminating the DC offset from the output signal 112 of the signal conditioner 110 for example.

The DAC 420 is configured to receive a data control signal, a digital signal for example, representative of a desired change, or a correction signal, which will be applied to the input signal 112. The output of the DAC 420, in response to this digital data control signal, may provide a voltage or current in a sufficient quantity to effectuate the desired change. For example, in the case of the inverting integrator circuit 404 as depicted, the DAC 420 may provide a current corresponding to the received digital signal such that the output signal 316 of the DAC 420 will reduce or minimize the DC offset seen at the output signal 112 of the signal conditioner 110. Alternatively, for example, the output of the DAC 420 can be a voltage corresponding to the received digital data control signal, the voltage provided to a summing circuit, as is well known in the art, to sum the voltage provided by the DAC 420 with the input signal 112 to produce an output signal 316 which acts to reduce or minimize the DC offset in the output signal 112 of the signal conditioner 110.

Control signals Control-S1 and Control-S2 provide for control of the switches S1 and S2, respectively. Switches S1 and S2 may be implemented through any suitable mechanisms, for example through the use of transistor circuitry, in order to provide the corresponding switching functionality. In operation, initially both switches S1 and S2 can be programmed, via the control system 320 of FIG. 3 for example, to be in an open, non-conducting state. As such, the output signal 112 from the signal conditioner 110 can be sampled by the control system 320 to determine or estimate the DC offset present, as part of signal 112 for example. Control system 320 may command the switch S2 to conduct such that the output signal 316 drives, or otherwise is applied to, one or more elements of the signal conditioner 110. The impact of the output signal 316 on the DC offset can be further observed through the continued sampling of the output signal 112 from the signal conditioner 110 by the control system 320. The control system 320 may also provide a digital data control signal, labeled "Data" in FIG. 3, to the DAC 420 and command the switch S1 to conduct such that the output of the DAC 420 is applied to the circuit 404. The control system 320 may further adjust the digital Data control signal while observing the output signal 112 until the DC offset is reduced, or eliminated, as desired. The programmable source 314 of FIG. 4 may be utilized with other such programmable sources 314 positioned throughout the processing circuit 100. As such, it may be desirable to have a certain DC offset at a first location of the circuit 100 in order to reduce, minimize, or eliminate the DC offset at a second location of the circuit 100.

Figure 5:
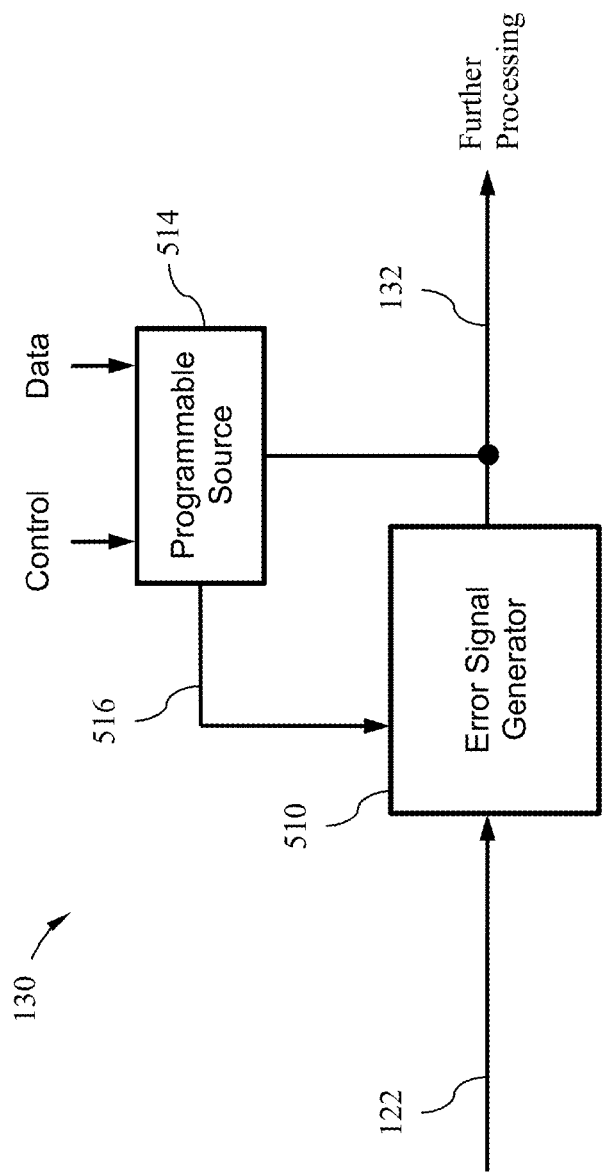
FIG. 5 is a more detailed block diagram of a second element of the receiver of FIG. 1, consistent with various aspects of the present disclosure.

With reference to FIG. 5, another exemplary circuit for reducing or eliminating DC offsets in the processing circuit 100 will be discussed. As discussed with respect to FIG. 1, the output 122 of summing element 120-1 is provided as an input to the error signal circuit 130. FIG. 5 depicts a more detailed view of the error signal circuit 130. As shown, error signal circuit 130 may include an error signal generator 510 and a programmable source 514. Error signal generator 510 accepts signal 122 as an input and provides a generated error signal 132 at an output of the generator 510. In a similar manner as with the signal conditioner 110, the error signal circuit 130 includes a feedback loop having a programmable source 514 which accepts the error signal 132 as an input and provides an output signal 516 based on the received error signal 132 and the control and data signals received from the control system 320, as described with respect to the programmable source 314 of FIG. 3. In this way, undesirable DC offsets can be reduced, or eliminated, from the error signal 132. As with the embodiment of FIG. 3, the control system 320 may be configured to sample or acquire the signal 132 to determine the extent which a DC offset is present.

Figure 6:
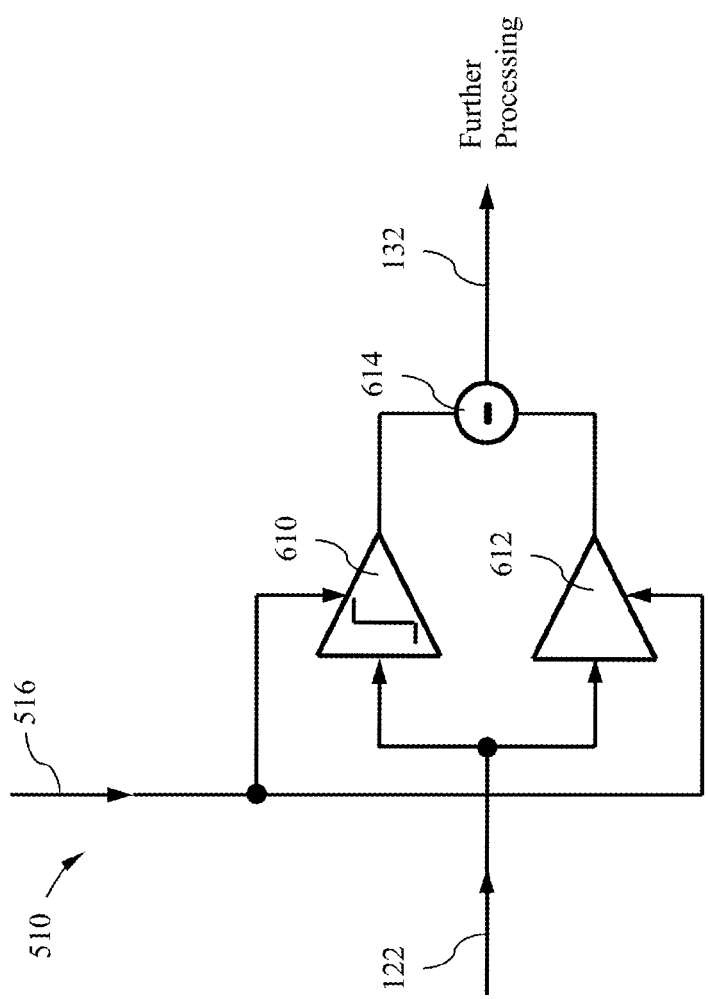
FIG. 6 is a more detailed block diagram of the second portion of the optical transceiver of FIG. 5, consistent with various aspects of the present disclosure.

Turing to FIG. 6, one exemplary error signal generator circuit will be discussed in greater detail. As mentioned above, the error signal generator 510 accepts the signal 112 as an input, as well as signal 516 from the programmable source 514. The error signal generator may include first and second amplifiers 610 and 612 which take the input signal 112 and amplify the input to provide first and second amplified outputs, the first amplified output provided to a first input of a difference element 614 and the second amplified output provided to a second input of the difference element 614. The difference element 614 calculates the difference of the first and second amplified outputs and provides the difference as the error signal 132 at an output of the difference element 614. The first amplifier 610 may be a limiting amplifier which oscillates between two values depending on the value of the input, while the second amplifier 612 may be a buffer amplifier. The input signal 516 received from the programmable source 514 may be provide as a voltage source offset to the first and second amplifiers 610, 612 such that the DC offset as observed by the control system 320 is reduced, or eliminated.

Figure 7:
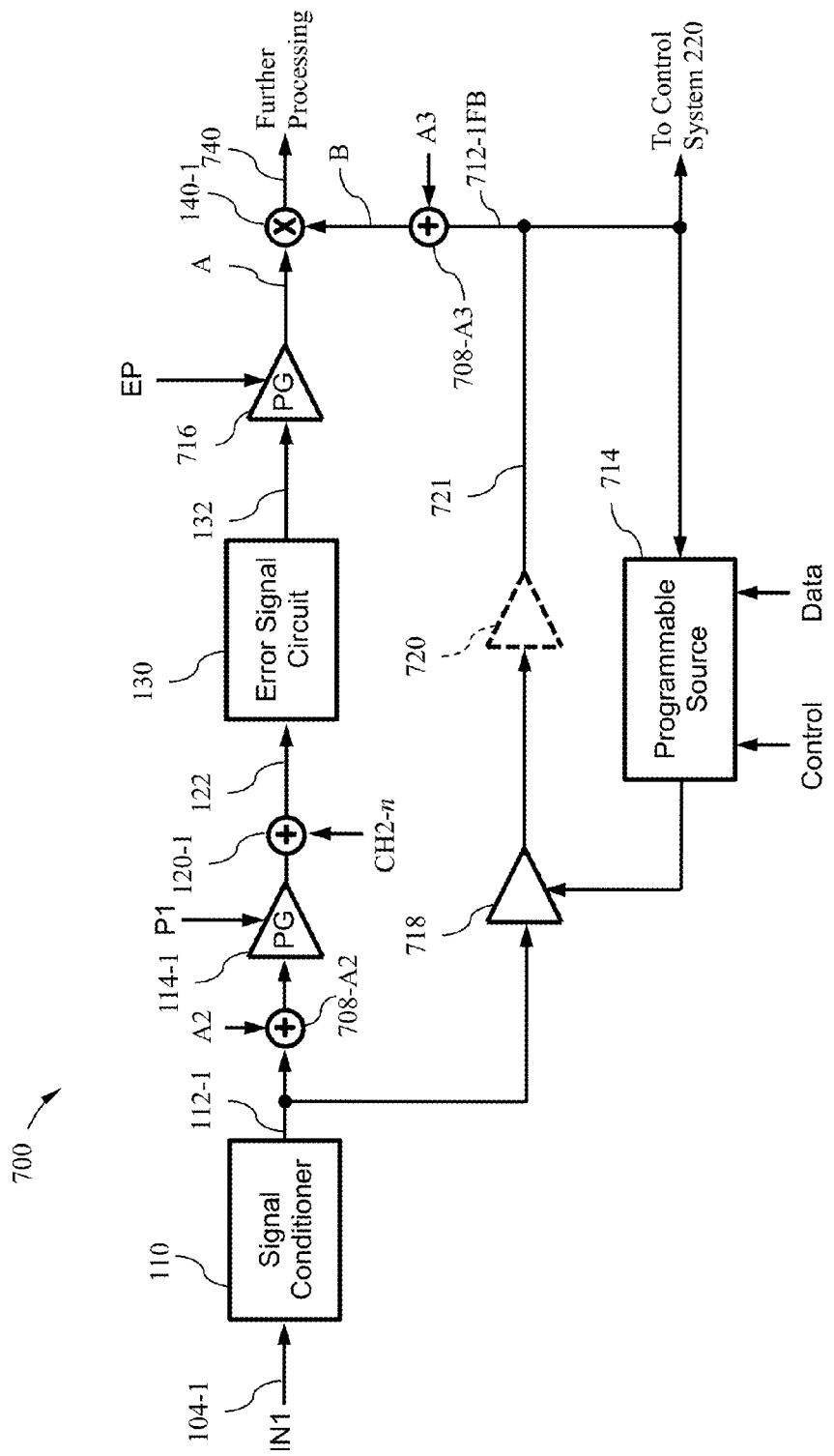
FIG. 7 is a block diagram of a second portion of a receiver, consistent with various aspects of the present disclosure.

Turning to FIG. 7, a block diagram of a second exemplary circuit 700, as part of a receiver, consistent with various aspects of the present disclosure, will be discussed. Circuit 700 depicts one of the n input channels, e.g. input channel IN1, as well as the corresponding signal conditioner circuit 110-1, as discussed above with reference to FIGS. 1-4 for example. The output signal 112-1, output from the signal conditioner circuit 110-1, is provided to the PGA 114-1 via a summing element 708-A2. As discussed with respect to summing element 308 above, summing element 708-A2 can be utilized to provide an additional input signal, labeled A2, in addition to signal 112, the signals summed together and provided to the input of the PGA 114-1 for example.

The circuit 700 also includes a feedback loop 712-1FB which receives the signal 112-1 from the signal conditioner circuit 110-1 and provides the signal to the second input of the correlator. The feedback loop 712-1FB includes an amplifier 718, as well as one or more amplifiers 720, for amplifying the signal 112-1. Additional amplifiers 720 may be provided to further amplify the signal, or invert the signal, as necessary prior to passing the signal on to the correlator 140-1 for example. As shown, a summing element 708-A3 may be positioned along the feedback loop 712-1FB to further modify the amplified signal 721, e.g. the amplified 112-1 signal, prior to providing the signal to the correlator 140-1. The position of the summing element 708-A3 is but one exemplary position, and the summing element 708-A3, as well as additional summing elements similar to element 708-A3 for example, may be positioned at other points along the feedback loop 712-1FB.

The amplified signal 721 may also be provided to the control system 320 such that the signal 721 may be acquired and analyzed to determined whether, and to what degree, the signal 721 includes a DC offset. The amplified signal 721 may also be applied to a programmable source 714, similar to the programmable sources 314, 514 previously discussed, in order to provide a feedback signal 715 to the amplifier 718, such that any DC offset as part of the amplified output signal 721 is reduced, or eliminated, as previously described with respect to the other programmable sources 314, 514.

As stated above, the output signal 112-1 of the signal conditioner 110-1 is also provided to the PGA 114-1 via the summing element 708-A2. The amplified output of the PGA 114-1 is applied to the first input of the summing element 120-1, and the summation of the similarly amplified signals from the remaining channels, labeled as CH2-n in FIG. 7, corresponding to input signals IN2 through INn for example, is provided at the second input of the summing element 120-1, as discussed above relative the signal processing circuit 100. The output of the summing element 120-1 is provided to the error signal circuit 130 which generates the error signal 132. The error signal 132 is provided to the first input of the correlator 140-1 via a PGA 716. The correlator 140-1 correlates or multiplies the amplified error signal 132, labeled A, with the amplified feedback signal, labeled B, to form the output signal 740. The output signal 740 may be directly or indirectly applied to the PGA 114-1 as gain signal P1, as discussed above with respect to circuit 100. If desired, the output signal may be further processed prior to being provided to PGA 114-1, for example through application of low pass filtering.

Consider the output 740 of the correlator 140-1 during a first time period to be the product AB+α, where A is the signal at the first input of the summing element 140-1, B is the signal at the second input of the summing element 140-1, and a is a DC offset present in the output signal 640. Data can be acquired relative this first output signal 740 value of AB+α, for example by control system 320. The PGA 716 provides a gain EP to the error signal 132 to form signal A. During a second time period, the gain EP applied to the error signal 132 may be inverted such that a signal −G is formed instead of G. Thus, the output signal during this time period would be −AB+α. Subtracting the second output signal 740 of the second time period from the first output signal 740 from the first time period yields 2AB, the DC offset values α during the first and second time periods effectively cancelling themselves out. Thus, by knowing the product 2AB, the product AB can be determined and, further, the DC offset value α can be determined as well. Once determined, the output signal 740 can be processed to subtract out, or otherwise compensate for, the DC offset value present as part of the signal 740. During operation of the signal processing circuit 700, the above procedure may be periodically performed to track the DC offset value a present, if any, within the output signal 740.

Figure 8:
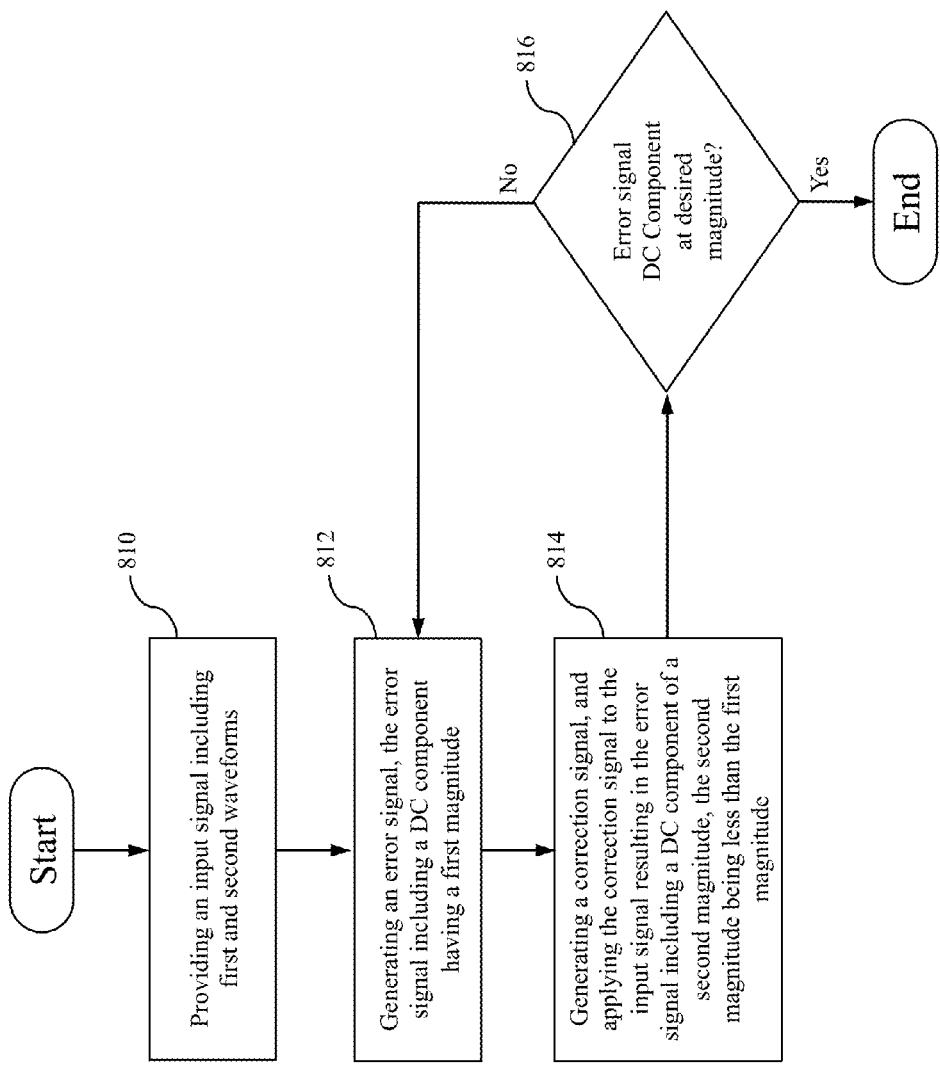
FIG. 8 is a block diagram of a method for processing a signal, independent of structure, consistent with various aspects of the present disclosure.

Turning to FIG. 8, a first method for reducing the DC offset in a signal processing circuit consistent with the present disclosure is discussed. An input signal is provided in a step 810, the input signal comprising first and second waveforms. An error signal is generated in a step 812, the error signal may include a DC component having a first magnitude. A correction signal is generated in a step 814. The correction signal may be derived from the error signal and an output from a source, a programmable source for example. The output of the source may be for example, a current or a voltage, which when combined with the error signal generates the correction signal. The correction signal is applied to the input signal which results in the error signal including a DC component of a second magnitude, the second magnitude being less than the first magnitude such that the DC component of the error signal is reduced, or otherwise eliminated.

If the DC component of the error signal is at a desired magnitude in a step 816, then the process is halted. More specifically, the method 800 of FIG. 8 may then be periodically performed to track the DC component of the error signal over time. If the DC component of the error signal does change over time, due to operating characteristics such as temperature, aging of the individual components of the processing circuit, such as circuit 100 or circuit 400, for example, then the method 800 can be performed again until the DC component of the error signal takes on a desired magnitude, e.g. value. As previously mentioned, such desired magnitude may be non-zero, the output of a particular part of the processing circuit 100, 400 to take on a non-zero value to enable another part of the processing circuit 100, 400 incorporating embodiments of the present invention to achieve a desired magnitude. In this way, the various sources of error correcting loops can work together to achieve the desired reduction, or elimination, of DC offsets in corresponding signal propagating through the processing circuit 100, 400. If the desired DC component of the error signal is not achieved in step 816, the process or method 800 continues at step 812 where an error signal, e.g. another error signal, is generated, followed by the generation of another correction signal in step 814 resulting in a reduced magnitude in the DC component of the error signal. If the desired magnitude of the DC component of the error signal is achieved in step 816, as stated above, the process or method is stopped, subject to periodic checks as discussed above.

Figure 9:
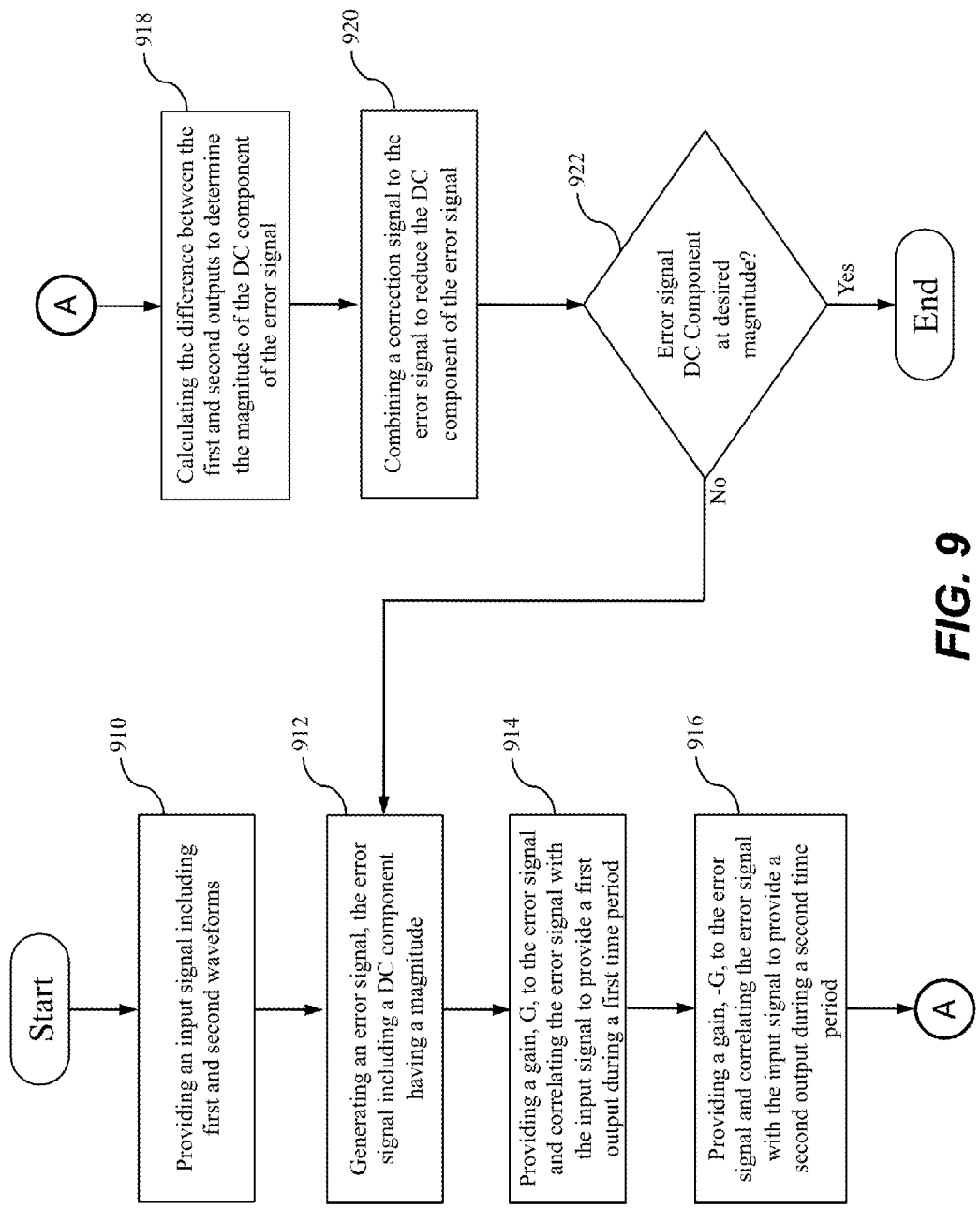
FIG. 9 is a block diagram of another method for processing a signal, independent of structure, consistent with various aspects of the present disclosure.

With reference to FIG. 9, a second method or process 900 for reducing the DC offset in a signal processing circuit consistent with the present disclosure is discussed. An input signal is provided in a step 910, the input signal including first and second waveforms. An error signal is generated in a step 912, the error signal including a DC component having a magnitude. A first gain, G, is provided to the error signal in a step 914, the error signal being correlated with the input signal to provide a first output during a first time period. A second gain, −G, e.g. equal to the first gain but of opposite sign, is provided to the error signal in a step 916, the error signal being correlated with the input signal to provide a second output during a second time period. The difference between the first and second output is calculated in a step 918 to determined the magnitude of the DC component of the error signal. The correction signal is combined with the error signal in a step 920 such that the magnitude of the DC component of the error signal is reduced, or eliminated.

If the DC component of the error signal is at a desired magnitude in a step 922, then the process is halted. More specifically, the method 900 of FIG. 9 may then be periodically performed to track the DC component of the error signal over time. If the DC component of the error signal does change over time, due to operating characteristics such as temperature, aging of the individual components of the processing circuit, such as circuit 100 or circuit 400, for example, then the method 900 can be performed again until the DC component of the error signal takes on a desired magnitude, e.g. desired value. As previously mentioned, such desired magnitude may be non-zero, the output of a particular part of the processing circuit 100, 400 to take on a non-zero value to enable another part of the processing circuit 100, 400 incorporating embodiments of the present invention to achieve a desired magnitude. In this way, the various sources of error correcting loops can work together to achieve the desired reduction, or elimination, of DC offsets in corresponding signal propagating through the processing circuit 100, 400. If the desired DC component of the error signal is not achieved in step 922, the process or method 900 continues at step 912 where an error signal, e.g. another error signal, is generated, followed by providing first and second outputs in accordance with steps 914 and 916. If the desired magnitude of the DC component of the error signal is achieved in step 922, as stated above, the process or method is stopped, subject to periodic checks as discussed above.

While the invention has been described in conjunction with several specific embodiments, it is evident to those skilled in the art that many further alternatives, modifications and variations will be apparent in light of the foregoing description. For example, while discussed with specific reference to optical receivers, the various aspects of the present invention can be applied to any circuit which compares one or more electrical signals, as part of a single data signal encoded therein. Thus, the invention described herein is intended to embrace all such alternatives, modifications, applications and variations as may fall within the spirit and scope of the appended claims.

What is claimed is:

1. A signal processor, comprising:
   a circuit having first and second inputs and an output, the circuit configured to receive an input signal including first and second waveforms on the first input and provide an error signal on the output, the error signal indicative of the presence of the second waveform in the input signal, the error signal including a signal component having a frequency of less than 1 kHz and a first magnitude;

a feedback loop including a programmable source providing an offset signal, the feedback loop being configured to receive the error signal and combine the offset signal and the error signal to form a correction signal which is provided to the second input of the circuit, wherein the offset signal is selected to provide the signal component of the error signal with a second magnitude, the second magnitude being less than the first magnitude, and wherein the circuit further comprises first and second amplifiers each having an input and an output, and a difference element, the input signal being provided to the input of each of the first and second amplifiers, the output of the first amplifier provided to a first input of the difference element and the output of the second amplifier provided to a second input of the difference element, the difference element configured to provide the difference of the output from the first amplifier and the output of the second amplifier on an output of the difference element, the output of the difference element provided as the output of the circuit, wherein the correction signal is provided to the first and second amplifiers, the correction signal providing a first offset to the output of the first amplifier and a second offset to the output of the second amplifier.

2. The signal processor of claim 1, wherein the programmable source includes a digital to analog convertor.

3. The signal processor of claim 1, wherein the offset signal is a voltage.

4. The signal processor of claim 1, wherein the offset signal is a current.

5. The signal processor of claim 1, wherein the magnitude of the first offset is substantially equal to a magnitude of the second offset.

6. The signal processor of claim 5, wherein the magnitude of the first offset is substantially equal to the magnitude of the DC component of the error signal.

7. The signal processor of claim 1, wherein the first amplifier is a limiting amplifier and the second amplifier is a buffer amplifier.

8. The signal processor of claim 1, wherein the signal component is a DC component.

9. The signal processor of claim 1, wherein the signal component has a frequency of less than 10 Hz.

10. A method for processing a data signal including first and second waveforms, the method comprising:

generating an error signal indicative of the presence of the second waveform in the signal, the error signal including a DC component having a first magnitude;

generating an offset signal;

combining the error signal with the offset signal to form a correction signal;

applying the correction signal to the input signal resulting in the DC component of the error signal having a second magnitude, wherein the second magnitude is less than the first magnitude of the error signal, and wherein the step of generating the error signal includes providing the input signal to first and second amplifiers, the correction signal providing a first offset to the output of the first amplifier and a second offset to the output of the second amplifier, wherein the step of applying the correction signal to the input signal includes providing the correction signal to the first and second amplifiers, each of the first and second amplifiers providing a gain to the input signal which is proportional to the correction signal.

11. The method of claim 10, wherein the first amplifier is a limiting amplifier and the second amplifier is a buffer amplifier.

* * * * *